Patented Mar. 9, 1943

2,313,076

UNITED STATES PATENT OFFICE 2,313,076

COLOR CONCENTRATE

Gustave Klinkenstein, Maplewood, Frederic Dannerth, East Orange, and Conrad Frey, Nutley, N. J., assignors to Maas & Waldstein Company, Newark, N. J., a corporation of New Jersey No Drawing. Application December 3, 1938, Serial No. 243,768

2 Claims. (Cl. 8—3)

This invention relates to the method for the preparation of a color concentrate and such a product for coloring liquid coating compositions and plastics to produce color effects and combinations not heretofore known.

In the production of plastic compositions and coating compositions of the type known as lacquers as well as paints, varnishes, inks and the like, the usual basic ingredients were generally colorless or substantially so and when applied to surfaces the results were largely protective with some decorative effect obtained because of the gloss imparted to the surface. To increase the usefulness of such products it was naturally suggested that coloring materials be added. In organic compounds of the class generally identified as pigments were frequently incorporated. These included mineral pigments of drab color lacking in brilliance and usually soluble in acids or alkalis as well as precipitated inorganic pigments having somewhat better brilliance but still drab and affected by acids or alkalis. Their addition to lacquers and plastics followed the general procedure recognized in the preparation of drying paints. This usually involved the preparation of the coloring matter frequently as a precipitate and then grinding this inorganic coloring material with a constituent of the paint to flocculate or disperse the pigment in the constituent of the coating material which was to be colored. This presented a number of problems and required a great deal of time as well as the expenditure of considerable power. The incorporation of toners produced opacity and some brilliance but lack of chemical and heat resistance and inherent drabness limited their usefulness.

When it was proposed to color lacquers and plastics, the same procedure was followed in that the cellulose derivatives or other film forming material from which the lacquers were made were ground with freshly precipitated inorganic matter such as pigments, particularly with the addition of solvents or partial solvents for the cellulose derivatives. Because there are a number of well recognized limitations in the colors obtainable from pigments the effects which can be produced by pigmented lacquers were likewise so restricted. Furthermore, the addition of inert inorganic pigments reduced the gloss of the lacquer coatings.

Recognizing that dyestuffs offered a greater variation of colors it has also been proposed to incorporate dyes with plastic and coating compositions. Among these proposals, are those which involve taking a precipitated insoluble dye or color lake and dispersing the finished color in a cellulose derivative either with or without the use of solvents. Satisfactory dispersion was difficult and in many instances involved a lengthy, expensive procedure. The treatment required to disperse the organic toner or lake frequently was of the type which destroyed some of the inherent value of the original coloring matter whereby the effects produced were not entirely satisfactory.

Soluble coloring materials have also been suggested. These were sometimes applied to cellulose nitrate in water solution but more frequently would be coloring agents which were soluble in a constituent, frequently the solvent of the lacquer, or an ingredient of a plastic. This procedure produced bright transparent colors of poor light fastness. Opacity as well as acid and alkali resistance was poor. Suggestions have also been made to combine pigments and dyes by precipitating or forming the dyes on a pigment suspended in the medium (usually water) in which the color is formed followed by dispersing the collected dyed pigment in a lacquer constituent such as the cellulose derivative.

A further step in the incorporation of coloring matter in lacquers involved the dissolution of a color base or leuco derivative in a clear lacquer i. e., a composition comprising the cellulose derivative and a solvent, the color base or leuco derivative being soluble in the solvents for the cellulose derivative. Into this clear lacquer a mordant or other color producing agent was introduced to form the color or insoluble dye in the clear lacquer. While this procedure represented some improvement over the methods theretofore used, it was necessarily subject to considerable limitation as to the coloring materials which could be employed and the technique presented many difficulties.

The process of dyeing cellulose fibres followed by acetylation to solubilize the cellulose imposes very serious limitations on the coloring materials operative for this purpose which must be capable of withstanding the acetylation reaction.

We have found a method for producing color concentrate for coloring plastic and coating compositions by uniformly dispersing therein brilliant opaque organic coloring materials which are very fast to light, air and washing. Because of the improved colors of these compositions they are useful not only as heretofore used but in the new field of textile printing.

Our invention provides a process for preparing a color concentrate which comprises suspending a flocculent, granular, powdered or precipitated cellulose derivative—hereinafter defined simply as flocculent—in a non-solvent, subjecting the suspended cellulose derivative to a high concentration of a color base that has been rendered soluble then developing the color of the color base in molecular contact with the cellulose derivative.

We also provide a color concentrate comprising a substrate of an ingredient for plastic compositions or liquid coating compositions in a flocculent form with an organic coloring material molecularly formed on the reaction faces.

By our process, it is possible to produce concentrations of color far in excess of those heretofore obtainable and as a result instead of working with large quantities of material we can provide color concentrates which, when mixed in small quantities with plastic compositions or with clear lacquers, impart the desired color to them. Our process is of such a nature that practically all of the dyes heretofore known which can be rendered water-insoluble for coloring or dyeing cellulose or its derivatives can be availed of whereby there is practically no limitation on the colors, shades or effects which may be obtained.

The basic material to which this invention is applied is preferably a constituent of the lacquer or plastic to be colored or in any event a material compatible with the lacquer or plastic. Among the usual constituents of such compositions are the cellulose derivatives classified as ethers and esters. The first, and more important, of these classes for the present purpose, include compounds known as ethyl cellulose, benzyl cellulose, which are alkyl and aryl derivatives. Cellulose nitrate, cellulose acetate, and cellulose aceto-butyrate illustrate the second class.

In many processes for the esterification or etherification of cellulose the original fibrous form of the cellulose fibre is retained. This is the preferred physical form for the cellulose derivative but it will be clear that where the basic cellulose derivative is in other forms it may also be used. Usually it is preferable to work with a derivative having as high a surface area per unit of weight as possible. In the fibrous form, this is attained in the cellulose derivative as prepared but other forms may be powdered or subdivided. All forms of cellulose derivatives with high surface areas are intended to come within the term "flocculent" as herein used.

The cellulose derivative in a fibrous or finely divided flocculent form presenting a large surface area both external and porous which may be termed reaction faces, is suspended in water or other fluid in which it is insoluble but in which an organic color base may be dissolved and there subjected to the action of the color base which will chemically react to adhere or otherwise attach itself to the cellulose derivative. The color base in molecular contact with the fibrous cellulose derivative may then be transformed into an insoluble color firmly affixed to the cellulose derivative by the addition of a reagent or mordant as is well recognized. By so doing, a very high concentration of color is produced in and on the finely divided cellulose derivative. The amount of color is far in excess of any which would be deposited in a normal dyeing operation. The action is primarily one of dyeing the cellulose derivative which must be distinguished from ordinary precipitation of a pigment in the presence of a suspended cellulose derivative as well as from those processes of coloring cellulose derivatives wherein a water soluble dye is adsorbed by the fiber. Lacquers produced therefrom are simply tinted. The developed color or our color concentrate is particularly affixed to the cellulose derivative as established by developing the color after the cellulose derivative has been removed from the dye bath and suspended in water for reaction with the developing agent. In practice it is preferred to develop the color in a dye bath of very high concentration to produce cellulose derivatives in combination with the color in high ratios. With low color ratios the major portion of the color is "dyed" to the cellulose derivative while higher ratios include increasing proportions of occluded color. We have found that one part of ethyl cellulose to as high as three parts of color, based on the dry color concentrate, will form a uniform dispersion of the color in a solvent for the ethyl cellulose. This is a liquid color concentrate.

The cellulose derivative carrying the coloring material in and on the fibers may, after drying, be used as such for a color concentrate to produce color in plastic or liquid coating compositions but is preferably mixed with a relatively small amount of a solvent for the cellulose derivative thereby producing a high concentration of the cellulose derivative with an extremely high concentration of color which does not dissolve in the solution but is dispersed therein by the dissolution of the base on which it was formed. No mechanical devices of any sort whatever are required.

This concentrated solution may be used in any quantity desired to impart color to a plastic composition or to a liquid coating composition.

This invention is particularly useful in the preparation of colored lacquer compositions for textile printing. According to present practice, a textile, usually of a uniform color, is printed with a predetermined design of one or more colors using therefor a color paste which is a composition including adhesive materials with which are mixed color bases. When applied to the cloth, the color is then developed or the dye formed by subjecting the cloth to such treatment as will form an insoluble color fixed on the fibers. Usually this involves passing the cloth through a chamber with an atmosphere of a volatile reactive substance such as an aldehyde or an acid. Usually, the cloth must be maintained in such atmosphere for several minutes with the result that in rapid operation large chambers are necessary and the material must be handled without appreciable surface contact. It has been proposed to print textiles with colored lacquer coating compositions but lacquers have not been particularly useful in this field because of the limitation in the colors which they would impart. Various tints were possible but when a tinted lacquer was applied to a colored textile there was simply a mixing of colors. The use of pigments while producing opacity did not provide adequate brilliance of color. Many colored lacquers were not fast to light and washing.

Following the teachings of this invention, it is possible to provide colored lacquers of great brilliancy with an infinite selection of colors providing fastness to light and washing. It will, therefore, be evident that this invention not only improves the colors of lacquers or plastics in their well known uses but opens up a new field for the use of these materials.

According to this invention, the finely divided and preferably fibrous cellulose derivative is subjected to the more or less colorless form of the dye, i. e., the leuco derivative which attaches itself to the cellulose derivative in a very high concentration after which the color is developed. Within the above procedure, a number of dyeing methods may be employed which can be classified according to the following classification recognized in the dye and color trades as:

1. Stabilized Azo dyes including those commercially known as Rapidogen (General Dyestuff Corp.), Pharmasol (Carbic Color and Chemical Co.), Diagen (E. I. Dupont de Nemours & Co.) and the like. These types of dyes are made soluble for impregnation of the fiber and then treated to develop the colored, water-insoluble dye.
2. Leuco derivatives of indigoid colors known commercially as Ponsols, Algasols and Indigosols.
3. Indigoid colors exemplified by Indanthrene and Carbanthrene.
4. Diazo dyes as exemplified by Paranitranilin Red.
5. Basic dyes exemplified by Victoria Blue.
6. Alizarin dyes exemplified by Alizarin Blue.

*Example I*

The following process illustrates one of the dyeing processes above, namely paragraph 1, for producing a high concentration of a stabilized azo dye on a cellulose ether, specifically ethyl cellulose. The ethers are preferably substrates because they are not chemically affected by the dyeing operation to the extent that esters may be.

Ten grams of Rapidogen Red powder, a water insoluble azo dye, are dissolved in approximately 200 cc. of hot water containing about 3.75 grams of a caustic soda solution with a concentration of 1.370 specific gravity. Solvents such as urea or ethylene glycol mono ethyl ether may be used in an amount substantially equal in weight to the dye powder to facilitate the solution of the color base which can be filtered. Ten grams of ethyl cellulose in a flaky or fluffy form, as originally prepared, are immersed in 200 cc. to 300 cc. of water to produce a suspension therein. The solution of the dye and the ethyl cellulose suspension is then mixed and agitated for a period of about ten minutes while the temperature of approximately 50° C. is maintained to permit the leuco color base to affix itself to the ethyl cellulose. Then a 10% solution of acetic acid in water is gradually added to the mixture of ethyl cellulose and dye base with continual agitation in an amount at least sufficient to produce an acid reaction to litmus. Alternatively, the ethyl cellulose may be removed from the dye bath then suspended in water to which the acid solution is added. The development of the red color in and on the ethyl cellulose substrate is completed by heating the mixture to between 80° and 100° C., then removing it from the source of heat and cooling the mixture. When cooled, the solid substrate carrying the developed dye in and on it is separated from the water soluble constituents of the exhausted dye bath. The separated solids after washing are dried in an oven at a temperature below 100° C. to remove free water. The dry dyed ethyl cellulose has increased its weight by 65% of the original weight, which increase is due to the coloring matter. For most purposes it is desirable to form as high a ratio of dye as possible in and on the substrate but preferably with a minimum precipitation of free coloring material.

When the developing of the dye takes place in the dye bath there will, in most cases, be some coloring material formed which is not strictly in molecular contact with the cellulose derivative but this will not be objectionable. A large proportion of the coloring material is molecularly associated with the cellulose derivative and therefore will be perfectly distributed in solutions. The remainder is also successfully dispersed when the cellulose derivative is dissolved.

The dried dyed ethyl cellulose color concentrate may now be dissolved directly in a lacquer but preferably is dissolved in just sufficient solvent therefor to produce a fluid mixture which may be used as a fluid color concentrate for coloring lacquers. This may be a 25% solution in butyl acetate.

The insoluble coloring material or dye, because of the process above described, is formed substantially as individual molecules in a fine state of dispersion in molecular contact with the substrate which affords no opportunity for its agglomeration. Some of the insoluble coloring material, and undoubtedly the major portion, has directly dyed the fibers. Another portion has probably been formed on the surface of the fibers but in all cases is in a finely dispersed condition. This dispersion is not lost and the addition of a solvent for the ethyl cellulose produces a dispersion of the coloring matter in the solution of the ethyl cellulose. The dispersion is maintained even with further dilution or by the addition of this color base to lacquers. For incorporation into plastic compositions the dried dyed ethyl cellulose may be employed in suitable proportions as such or, where some solvent is desired to work the plastic, the solution of the color concentrate can be used.

*Example II*

Ethyl cellulose may also be dyed with a basic dye of the type set forth in paragraph 5 above. Five grams of tannic acid and 10 cc. of 80% acetic acid are dissolved in 100 cc. of water and mixed with a suspension of 10 grams of ethyl cellulose in 200 cc. of water until the ethyl cellulose is thoroughly impregnated with tannic acid and acetic acid. To this mixture is added approximately 100 cc. of water containing three or four grams of Victoria Blue B Conc. and the combined liquids well agitated to produce uniform color formation on the substrate. To complete the reaction, the entire mixture is brought to the boiling point then removed from the heat, cooled and the colored ethyl cellulose separated from the water. After washing, it is dried in an oven preferably between 75° and 80° C. and in any event, below about 100° C. This product may be used as described in connection with Example I or in any of the other ways described herein.

The following indicates a suitable lacquer composition:

| | Parts by weight |
|---|---|
| Nitrocellulose R. S. 4 to 5 seconds | 5.0 |
| Raw castor oil | 10.0 |
| Colored ethyl cellulose (dry) | 20.0 |
| Butyl acetate | 90.0 |
| | 125.0 |

Example III

Twenty grams of Algasol Blue IBC powder (General Dyestuff Corp.) are dissolved with twelve grams of Glyezine (diethylene sulfo-glycol) and twelve grams of 20% potassium chromate solution in 250 cc. of water. This solution of the color base is mixed with a suspension of forty grams of ethyl cellulose and agitated for about ten minutes to insure thorough impregnation of the ethtyl cellulose fibers with the dye base. Then the acid solution comprising 10 cc. of 80% acetic acid and 90 cc. of water is slowly added while continuing the agitation and the entire mixture heated to a temperature of from 90° to 100° C. when it is cooled. After cooling the solids, comprising the dyed ethyl cellulose, are separated from the liquid and well washed to remove all soluble matter. After drying at a temperature below about 100° C. the dyed ethyl cellulose may be used as described.

Example IV

Ten grams of cellulose acetate in a very finely divided or fibrous condition are suspended in about 200 cc. of water. Fifty cc. of a 20% commercial solution of a water insoluble azo dye such as Pharmasol Red (Carbic Color and Chemical Co.) are mixed with 2.5 grams of a 32° Bé. caustic acid solution and 200 cc. of water and added to the cellulose acetate suspension. Agitation is continued for about fifteen minutes to insure thorough impregnation. An acid mixture prepared with 85 cc. of water, 10 cc. of 80% acetic acid and 5 cc. of 25% formic acid is gradually added to the mixture under agitation to develop the color. This is assisted by heating the mixture to between 95° and 100° C. after which the liquid is cooled, the solids separated, washed and dried. The dyed cellulose acetate provides a color concentrate as such or may be dissolved to form a 25% solution in a solvent such as acetone or diacetone. A lacquer embodying the colored cellulose acetate may be made according to the following formula:

| | Parts by weight |
|---|---|
| Cellulose acetate | 9 |
| Ethyl phthalyl ethyl glycollate | 9 |
| Ethyl lactate | 5 |
| Methyl cellosolve | 37 |
| Colored cellulose acetate | 10 |
| Acetone | 15 |
| Diacetone alcohol | 15 |
| | 100 |

The proportion of coloring material associated with the cellulose derivative as described above may be made very large. Thus the proportion may vary from 0.65 part to 3 parts of the coloring material for 1 part of the cellulose derivative.

While the invention has been described with reference to certain preferred embodiments illustrated by specific examples, these are to be considered illustrative of the invention and not in limitation thereof.

What is claimed is:

1. In coloring a cellulose derivative selected from the group consisting of water-insoluble esters and ethers of cellulose, the method which comprises suspending the cellulose derivative in the form of permeable particles in water, treating the suspended particles with a water-soluble leuco color base in alkali solution, so that the color base is adsorbed upon and within the particles, and then adding a developing agent including an acid that is soluble in water which neutralizes the alkali and that converts the adsorbed color base to insoluble material of desired color upon and within the particles of cellulose derivative as the acid developing agent penetrates the said cellulosic particles.

2. In coloring particles of cellulose ether, the method which comprises suspending the cellulose ether in the form of particles in water, treating the suspended particles with an aqueous solution including tannic acid and acetic acid, and then adding a water-soluble developing agent adapted to react with the tannic acid and establish the desired color.

GUSTAVE KLINKENSTEIN.
FREDERIC DANNERTH.
CONRAD FREY.